Sept. 25, 1945.  R. W GRIMBLE  2,385,505
PRODUCTION OF HALIDES
Filed Dec. 31, 1943
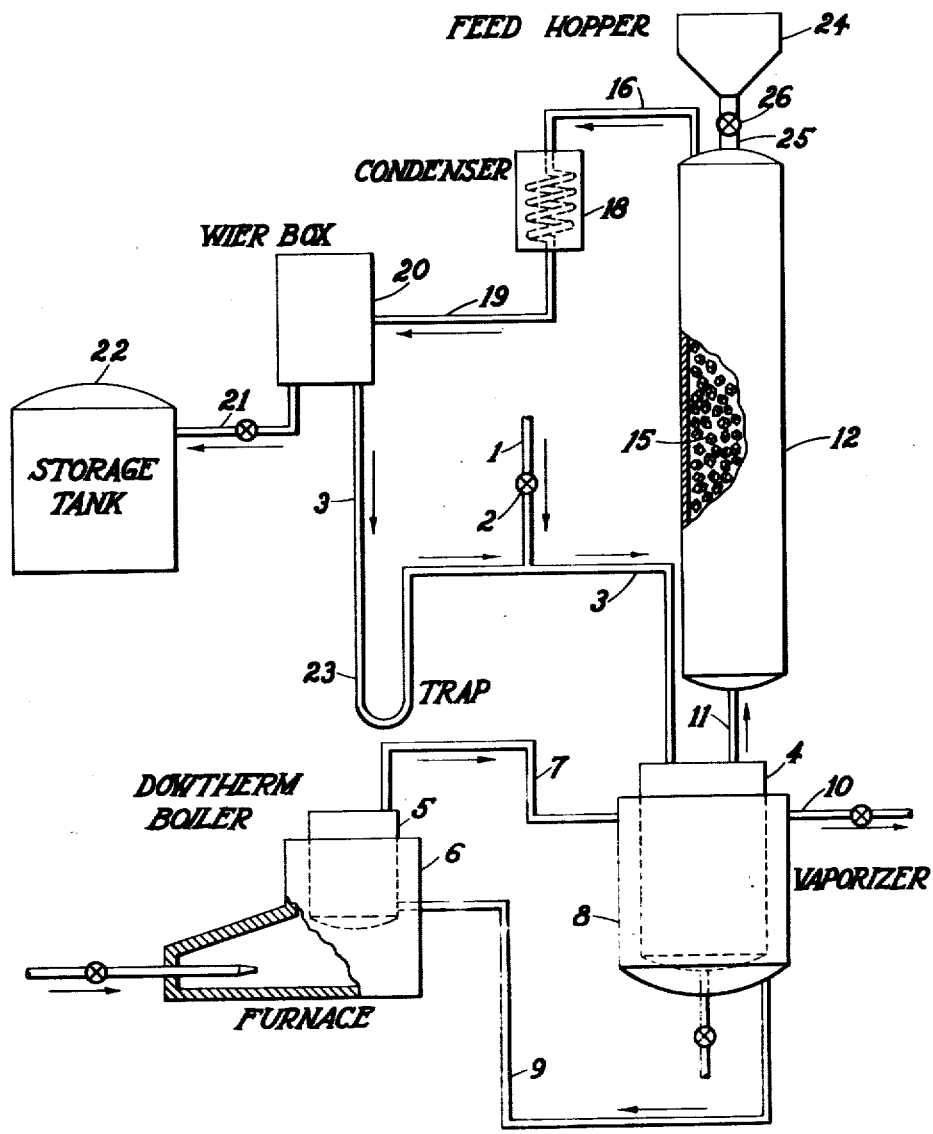
Robert W. Grimble
INVENTOR
BY Sidney A. Johnson
ATTORNEY Patented Sept. 25, 1945

2,385,505

UNITED STATES PATENT OFFICE 2,385,505

PRODUCTION OF HALIDES

Robert W. Grimble, Dallas, Tex., assignor, by mesne assignments, to Socony-Vacuum Oil Company, Incorporated, New York, N. Y., a corporation of New York Application December 31, 1943, Serial No. 516,381

10 Claims. (Cl. 23—93)

The invention relates to a process of manufacturing metallic halides. Primarily, the invention is concerned with the provision of a method for producing anhydrous metallic halides by utilizing the direct reaction between the metal and the halogen gas.

The increasing use of anhydrous metallic halides, such as aluminum bromide, as catalytic agents in the fields of organic and petroleum chemistry has created a need for a more economical method of producing these substances on a commercial scale.

The efficient utilization of reactions between metals and halogen gases to prepare metallic halides generally presents two major difficulties, viz.; (1) the problem of providing satisfactory means of controlling the temperature of the reactions, which are generally highly exothermic in character, and (2) the problem of avoiding the necessity of periodic replacement of expensive equipment, due to the excessive corrosive action of the halogen vapors.

Heretofore, in order to overcome the difficulties mentioned above, various methods of carrying out these reactions have been proposed. The most important of these methods are: (1) employing the halogen in the liquid state so that the reaction is conducted at low temperature; (2) separating the reaction into two steps whereby the metal is converted first to the oxide, and then in the second step reacting a hydrogen halide with the intermediary compound to produce the metallic halide (in this way the total heat of formation of the halide is not released all at once, but is divided between the two steps); (3) admitting a mixture of halogen gas and a diluent gas, such as hydrogen, to the reaction chamber, the inert gas serving to carry off the excess heat of reaction; (4) cooling the reaction zone by refluxing a portion of the product back into the reaction zone; and (5) employing a very low rate of halogen feed so that only small quantities will react at any one time and temperature rise is prevented by the normal heat losses.

The first of the above mentioned processes is disadvantageous in that expensive cooling equipment is necessary in order to control the temperature and thus prevent a violent reaction between the aluminum and the excess of halogen present in the reactor. The second process possesses the disadvantage that it complicates the problem of purifying the product particularly where an anhydrous halide is desired. The third process besides being inherently expensive, also causes contamination of the product and lowers the rate of production considerably. The fourth mentioned process is unsatisfactory, when used on a large scale, because it does not provide uniform cooling of the reaction zone and in many instances "hot spots" develop in the metal packing, thereby causing the metal to melt and clog the reactor. The lack of economy in the last mentioned method is obvious.

A further disadvantage, common to all of the above mentioned processes, with the possible exception of method (3) resides in the fact that they are non-continuous "batch" processes of limited production capacity. Such processes are invariably costly due to necessary periods of idleness required for cooling and recharging of the reactors.

A primary object of the present invention is to provide an improved, economical method for the production of anhydrous metallic halides, such as aluminum bromide, which is continuous in operation and which is capable of producing the halides on a commercial scale with a minimum of operating difficulties.

Another object is to provide a method which is advantageous from the standpoint of safety of operation. Thus, since the present method does not employ circulating water to cool the reactor, the possibility of a dangerous explosion, which might result from corrosion and leakage of water from the cooling system into the reactor, is eliminated.

Still another object of the invention is to provide means whereby the temperature of the reaction may be closely controlled, thus avoiding the possibility of a violent and uncontrollable reaction. Accurate temperature control also allows use of materials of construction such as glass lined equipment rather than the more expensive corrosion-resistant alloys.

A further object is to provide a method which yields a product of high purity, requiring no additional purifying treatment.

Other objects of my invention will be evident from the following detailed description thereof and the appended claims.

I have discovered that in the carrying out of reactions between metals and halogen gases to give metallic halide vapors, the temperature of the reaction may be conveniently controlled and a continuously operable process provided which is capable of producing pure metallic halides economically on a commercial scale by utilizing the product vapors themselves in admixture with the halogen reactant gases whereby these product vapors serve as heat absorbing and conducting means to remove the excess heat from the reaction zone.

The invention will be particularly described in connection with the manufacture of aluminum bromide, although the principles thereof are equally applicable to the manufacture of other metallic halides. Essentially, my process comprises passing the bromide vapor in admixture with recycle aluminum bromide product vapor continuously through a reaction tower packed with pieces of metallic aluminum while maintaining a temperature within the tower of from about 600° to 900° F. As the vapors pass through the tower the bromide content of the vaporous mixture is completely utilized to form additional aluminum bromide by reaction with the aluminum. The excess heat produced by the reaction is absorbed by the aluminum bromide vapors, which pass out of the reaction tower. A suitable portion of said vapors is then cooled and recycled through the reactor in admixture with fresh bromine vapor.

A more complete understanding of my invention may be had from the following description thereof taken in connection with the accompanying drawing, which diagrammatically illustrates one form of apparatus suitable for carrying out my invention.

Referring to the drawing, bromine vapor from a suitable supply source is fed to the process by way of line 1 which is provided with a suitable control valve 2. From line 1 the bromine is discharged into line 3 where it joins the molten aluminum bromide recycle stream whose origin is described hereinafter. The combined stream, comprising liquid aluminum bromide and bromine vapor, is conducted to the vaporizer 4. The temperature of the vaporizer is maintained at a sufficiently high level above the boiling point of aluminum bromide to cause vaporization of the molten aluminum bromide therein. A satisfactory temperature for example is from 500° to 550° F.

The vaporizer is heated by means of a conventional Dowtherm boiler 5 and furnace 6, the heat-exchanging fluid from the boiler being circulated through line 7 to heating jacket 8 surrounding the vaporizer, and returned to the boiler by way of line 9. A suitable outlet 10 is provided near the top of the evaporizer jacket in order to vent any gases, such as air, which may be trapped therein. The bromine-aluminum bromide vaporous mixture passes from the vaporizer into line 11, from whence it enters the bottom of the reaction tower 12 which has been previously brought up to reaction temperature, i. e., 600° to 900° F., by means of external electric heaters (not shown) provided around the walls of the tower for that purpose. Obviously any other type of heater could be used, or the tower could be brought up to reaction temperature by the hot vapors from the vaporizer.

The reaction tower is packed with suitably sized pieces of metallic aluminum 15 so as to allow a large amount of contact surface for reaction with the bromine gas, and at the same time provide free space for the passage of the vapors up through the reaction zone.

The reaction between the bromine and the aluminum is highly exothermic in character. When the first bromine containing vapors enter the tower, the reaction begins and the heaters are turned off. The heat generated by the reaction will be more than sufficient to maintain the desired operating temperature within the tower.

The main portion of the excess heat over and above that required to maintain reaction temperature in the tower is absorbed by the aluminum bromide exit vapors from the reaction tower. The remainder of the reaction heat is dissipated by radiation and conduction through the tower walls.

As the vaporous mixture passes up the tower its bromine content is rapidly converted by reaction with the aluminum to form aluminum bromide, and the product stream leaving the top of the tower through line 16 comprises practically pure aluminum bromide vapors. The relatively hot vapors, containing much of the heat produced by the reaction in the tower are directed in line 16 to a suitable condenser 18 wherein they are condensed. The molten aluminum bromide is withdrawn from the condenser in line 19 and sent to the weir box 20 wherein it is separated into two streams viz., a recycle stream which is withdrawn through line 3 and a product stream which is taken off by way of line 21. Line 3 carries the recycle portion of the product back to the vaporizer after admixture with the fresh bromine feed is hereinbefore described. The product stream in line 21 is discharged into the tank 22 for storage. All lines carrying liquid aluminum bromide in the system are steam traced to prevent solidification of the metallic halide therein. A suitable trap 23 is provided in line 3 to prevent possible contamination of the aluminum bromide product by leakage of bromine vapor back through this line to weir box 20. The reaction tower is provided with a hopper 24 containing suitably sized pieces of aluminum for periodically recharging the tower. The recharge is admitted through line 25 by turning the star valve 26 which allows admission of the aluminum without allowing a direct opening of the tower to the air.

My invention is further illustrated by the following example describing a typical operation carried out on a pilot plant scale and stating specifically the design and construction of the apparatus employed as well as the operating temperature, the bromine feed rate, the recycle ratio and the mass flow rates utilized in the system. It will be apparent to those skilled in the art that the contact time of bromine vapors with the metallic aluminum should be sufficient to insure complete conversion of the bromine. The necessary contact time is, of course, a function of the reaction temperature employed, and depends upon the mass velocity and the length and type of aluminum packing used in the tower. Also, the particular recycle ratio to be employed will depend upon the amount of heat losses from the tower, by radiation, conduction and the like, due to the particular type of tower used. In the example given hereinbelow, complete conversion of bromine was obtained. It is to be understood, of course, that the invention is not to be construed as limited in any way by the example.

*Example*

The apparatus set up is similar to that illustrated in the drawing and described above. The reaction tower used in this particular experimental run was 4 feet in length and 4 inches in diameter (inside). Thermocouple wells were provided so that the temperature at various points in the reaction zone could be determined. The tower was packed with one-half inch aluminum cubes to a height of 3 feet. The vaporizer was made of 10 inch pipe with a standard welding cap for the bottom, flanged on top, and jacketed with 12 inch pipe. The entire system including the reactor, vaporizer, condenser, weir box, storage tank and all conducting pipes were glass lined to prevent corrosive action of the vapors. The reaction tower was initially brought up to the desired reaction temperature of 720° F. by electric heaters installed on the tower. The reaction was started by admitting bromine vapor to the tower. The heaters were then turned off and the average temperature inside the reactor was thereafter maintained at about 720° F. by adjusting the recycle ratio. When equilibrium conditions obtained throughout the system, the following data were taken:

Bromine feed rate _____ lb. per hour__ 14
AlBr₃ production rate_____ lb. per hour__ 15.6
AlBr₃ recycle rate_____ lb. per hour__ 461
AlBr₃ recycle ratio_____ 29.5 to 1

Mass flow rates through the tower:

Bromine lb. per hr. per sq. ft_____ 160
Aluminum bromide production lb. per hr. per sq. ft_____ 178
Mass vapor rate (total recycle plus production) lb. per hr. per sq. ft_____ 5450

Provision of means for externally cooling the tower is not recommended since this may cause excessive condensation of vapors in the tower which will decrease throughput capacity without serving to take away heat uniformly from the reaction zone. However, when operating at temperatures within the lower portion of the indicated range, some condensation of aluminum bromide vapors may take place in the upper portion of the tower, without affecting the principle of operation of my invention.

Theoretically, the temperature employed in the tower is limited only by the melting point of aluminum, viz., 1216° F. and by the boiling point of aluminum bromide, i. e., 493° F. Actually, however, about 1000° F. represents the upper practical operating range, since above this temperature localized "hot spots" are apt to develop due to unequal distribution of heat in the tower. These "hot spots" produce operating difficulties, such as melting of the aluminum metal, with a consequent clogging of the tower. In general the recommended procedure is to design a tower of suitable size and shape for operation within the range of from about 600° to 700° F. In this way when an increase in production is desired it may be readily obtained by increasing the bromine feed, while at the same time correspondingly decreasing the recycle ratio employed. While this will cause the temperature level of the tower to be increased, operation within a safe temperature range may still be obtained.

Though I have described my invention with particular reference to the production of aluminum bromide, my process is adaptable for the manufacture of other metallic halides. Metallic halides whose temperatures of vaporization are substantially below the melting points of their respective constituent metals may be manufactured by my process. Such halides, for example, as antimony chloride, antimony bromide, stannic chloride, ferric chloride, aluminum chloride and many others fall within this classification.

It is to be understood that the conditions of my process will vary considerably depending upon the particular halide being manufactured. Thus, it will be evident that the proper reaction temperature to be employed will depend upon the boiling point of the halide to be manufactured and the melting point of its constituent metal, while the recycle ratio will depend upon the heat of formation of the desired product and the heat capacity of its vapor at the particular reaction temperature employed.

An alternative method of conducting my process would be to cool the product vapors over a suitable temperature range and then return a portion of the cooled vapors directly to the reaction tower without actually condensing them. This mode of operation is particularly applicable where the process is being utilized in the preparation of such halides as aluminum chloride and ferric chloride, since these salts sublime when heated at ordinary pressures and do not have a liquid state at atmospheric pressure. Salts of this type, however, might be prepared by operating the process in the manner described in connection with the drawing, but under elevated pressures. Thus in the case of aluminum chloride, for example, the process may be carried out by maintaining a pressure of at least 2 atmospheres within the system. Under a pressure of 2.5 atmospheres, for example, aluminum chloride melts at a temperature of about 375° F., and boils at about 400° F. The reaction temperature within the contact tower in this instance then should be maintained within the range of from about 420° F. to 1200° F., preferably from about 600° F. to 900° F. The temperature within the condenser and the flow lines should be controlled to maintain the aluminum chloride therein between 375° to 400° F. so that the aluminum chloride will be in the liquid state for circulation in the manner described.

By reference to "metallic halides whose temperatures of vaporization are substantially below the melting points of their respective constituent metals," as employed in the foregoing specification, I mean to include those halides whose boiling or sublimation points are at least about 100° F. lower than the melting points of their respective metallic constituent elements.

While my invention has been described in connection with the preferred modes of carrying out the process and with a preferred form of apparatus therefor, it is to be understood that the invention is not restricted to the specific modifications herein described and illustrated, but is intended to include such modifications and variations of the method and apparatus as fall within the scope of the appended claims.

I claim:

1. A process for the production of anhydrous metallic halides whose temperatures of vaporization are at least about 100° F. below the melting points of their respective constituent metals by direct reaction of the solid metals with halogen gases which comprises the steps of: (1) passing a mixture of halogen gas and metallic halide vapor obtained in the manner hereinafter defined into a reaction zone containing the solid metal reactant in a suitably divided state, (2) maintaining a temperature within the reaction zone above the vaporization temperature of the desired metallic halide product and below the melting point of the metal reactant by controlling the relative proportions of halogen gas and metallic halide vapor in step 1 whereby additional metallic halide vapor is formed by reaction of the halogen gas with the metal, (3) removing the metallic halide vapors from the reaction zone, (4) utilizing a cooled portion of the metallic halide vapors obtained in step 3 as the metallic halide vapor in step 1, and (5) recovering the remaining portion of the metallic halide as product.

2. A process for the production of anhydrous aluminum bromide by direct reaction of metallic aluminum with bromine which comprises the steps of: (1) passing a mixture of bromine and aluminum bromide vapor obtained in the manner hereinafter defined into a reaction zone containing sized particles of metallic aluminum, (2) maintaining a temperature within the reaction zone above the boiling point of aluminum bromide and below the melting point of metallic aluminum by controlling the relative proportions of bromine and aluminum bromide vapor in step 1 whereby additional aluminum bromide vapor is formed by reaction between the bromine vapor and the metallic aluminum, (3) removing the aluminum bromide vapors from the reaction zone, (4) utilizing a cooled portion of the aluminum bromide vapors obtained from the reaction zone in step 3 as the aluminum bromide vapor in step 1, and (5) recovering the remaining portion of the aluminum bromide as product.

3. A process for the production of anhydrous aluminum bromide by the direct reaction of metallic aluminum with bromine vapor which comprises the steps of: (1) passing a mixture of bromine vapor and aluminum bromide vapor obtained in the manner hereinafter defined into a reaction zone containing sized particles of metallic aluminum, (2) maintaining a temperature within the reaction zone above the boiling point of aluminum bromide and below the melting point of metallic aluminum by controlling the relative proportions of bromine vapor and aluminum bromide vapor in step 1 whereby additional aluminum bromide vapor is formed by the reaction of the bromine vapor with the metallic aluminum, (3) removing the aluminum bromide vapors from the reaction zone, (4) condensing the aluminum bromide vapors, (5) revaporizing a portion of the aluminum bromide condensate for use as the aluminum bromide vapor in step 1, and (6) recovering the remaining portion of aluminum bromide condensate as product.

4. A process for the production of anhydrous metallic halides whose boiling points are at least about 100° F. below the melting points of their respective metallic constituents by direct reaction of the solid metals with halogen gases which comprises the steps of: (1) passing a mixture of halogen gas and metallic halide vapor obtained in the manner hereinafter described into a reaction zone containing the solid metal reactant in a suitably divided state, (2) maintaining a temperature within the reaction zone above the boiling point of the desired metallic halide product and below the melting point of the metal reactant by controlling the relative proportions of halogen gas and metallic halide vapor in step 1 whereby additional metallic halide vapor is formed by reaction of the halogen gas with the metal, (3) removing the metallic halide vapors from the reaction zone, (4) utilizing a cooled portion of the metallic halide vapors obtained in step 3 as the metallic halide vapor in step 1, and (5) recovering the remaining portion of the metallic halide from step 4 as product.

5. A process for the production of anhydrous aluminum bromide by direct reaction of metallic aluminum with bromine which comprises the steps of: (1) passing a mixture of bromine and aluminum bromide vapor obtained in the manner hereinafter defined into a reaction zone containing sized particles of metallic aluminum, (2) maintaining a temperature within the reaction zone of from 600° to 900° F. by controlling the relative proportions of bromine and aluminum bromide in step 1 whereby additional aluminum bromide vapor is formed by reaction between the bromine vapor and the metallic aluminum, (3) removing the aluminum bromide vapors from the reaction zone, (4) utilizing a cooled portion of the aluminum bromide vapors obtained from the reaction zone in step 3 as the aluminum bromide vapor in step 1, and (5) recovering the remaining portion of the aluminum bromide from step 4 as product.

6. A process for the production of anhydrous aluminum chloride by the direct reaction of metallic aluminum with chlorine vapor which comprises the steps of: (1) passing a mixture of chlorine vapor and aluminum chloride vapor obtained in the manner hereinafter defined into a reaction zone containing sized particles of metallic aluminum, (2) maintaining a temperature within said reaction zone above the boiling point of aluminum chloride and below the melting point of metallic aluminum by controlling the relative proportions of chlorine and aluminum chloride vapor in step 1 whereby additional aluminum chloride vapor is formed by reaction of the chlorine gas with the metallic aluminum, (3) removing the aluminum chloride vapor from the reaction zone, (4) subjecting the aluminum chloride vapors from step 3 to condensing conditions of temperature and a pressure of at least two atmospheres whereby said vapors are liquefied, (5) revaporizing a portion of the aluminum chloride condensate for use as the aluminum chloride vapor in step 1, and (6) recovering the remaining portion of the aluminum chloride condensate as product.

7. A process for the production of anhydrous metallic halides whose temperatures of vaporization are at least about 100° F. below the melting points of their respective constituent metals by direct reaction of the solid metals with halogen gases which comprises the steps of: (1) passing a halogen gas and a metallic halide vapor into a reaction zone containing the solid metal reactant in a suitably divided state, (2) maintaining a temperature within the reaction zone above the vaporization temperature of the desired metallic halide product and below the melting point of the metal reactant by controlling the relative proportions of halogen gas and metallic halide vapor in step 1 whereby additional metallic halide vapor is formed by reaction between the halogen gas and the metal, and (3) removing the metallic halide vapor from the reaction zone.

8. A process for the production of anhydrous aluminum bromide by direct reaction of metallic aluminum with bromine which comprises the steps of: (1) passing a mixture of bromine and aluminum bromide into a reaction zone containing sized particles of metallic aluminum, (2) maintaining a temperature within the reaction zone above the boiling point of aluminum bromide and below the melting point of metallic aluminum by controlling the relative proportions of bromine and aluminum bromide in step 1, whereby aluminum bromide vapor is formed by reaction between the bromine and the metallic aluminum, and (3) recovering the aluminum bromide from the reaction zone.

9. A process for the production of anhydrous metallic halides whose temperatures of vaporization are at least about 100° F. below the melting points of their respective constituent metals by direct reaction of the solid metals with halogen gases which comprises the steps of: (1) mixing the halogen gas with metallic halide vapor of the metallic halide to be formed, the temperature of said metallic halide vapor being below the temperature to be maintained in step 3, (2) passing the mixture obtained in step 1 into a reaction zone containing the solid metal reactant in a suitably divided state, (3) maintaining a temperature within the reaction zone above the vaporization temperature of the desired metallic halide product and below the melting point of the metal reactant by controlling the relative proportions of halogen gas and metallic halide vapor in step 1 to form additional metallic halide vapor by reaction between the halogen vapor and the metal, and (4) recovering the metallic halide vapor from the reaction zone.

10. A process for the production of anhydrous metallic halides, whose sublimation points are at least about 100° F. below the melting points of their respective metallic constituents, by the direct reaction of the solid metals with halogen gases which comprises the steps of (1) passing a halogen gas and metallic halide vapor obtained in the manner hereinafter defined into a reaction zone containing solid particles of the metal in a suitably divided state, (2) maintaining a temperature within said reaction zone above the sublimation point of the desired metallic halide product and below the melting point of metal reactant by controlling the relative proportions of halogen gas and metallic halide vapor in step 1, whereby additional metallic halide vapor is formed by reaction of the halogen gas with the metal, (3) removing the metallic halide vapors from the reaction zone, (4) utilizing a cooled portion of the metallic halide vapors obtained in step 3 as the metallic halide vapor in step 1, and (5) recovering the remaining portion of the metallic halide from step 4 as product.

ROBERT W. GRIMBLE.

Certificate of Correction

Patent No. 2,385,505. September 25, 1945.

ROBERT W. GRIMBLE

It is hereby certified that errors appear in the printed specification of the above numbered patent requiring correction as follows: Page 2, first column, lines 8 and 14, for "bromide" read *bromine*; and second column, line 25, for "feed is" read *feed as*; and that the said Letters Patent should be read with these corrections therein that the same may conform to the record of the case in the Patent Office.

Signed and sealed this 23d day of April, A. D. 1946.

[SEAL]

LESLIE FRAZER,
*First Assistant Commissioner of Patents.* metallic halides whose temperatures of vaporization are at least about 100° F. below the melting points of their respective constituent metals by direct reaction of the solid metals with halogen gases which comprises the steps of: (1) mixing the halogen gas with metallic halide vapor of the metallic halide to be formed, the temperature of said metallic halide vapor being below the temperature to be maintained in step 3, (2) passing the mixture obtained in step 1 into a reaction zone containing the solid metal reactant in a suitably divided state, (3) maintaining a temperature within the reaction zone above the vaporization temperature of the desired metallic halide product and below the melting point of the metal reactant by controlling the relative proportions of halogen gas and metallic halide vapor in step 1 to form additional metallic halide vapor by reaction between the halogen vapor and the metal, and (4) recovering the metallic halide vapor from the reaction zone.

10. A process for the production of anhydrous metallic halides, whose sublimation points are at least about 100° F. below the melting points of their respective metallic constituents, by the direct reaction of the solid metals with halogen gases which comprises the steps of (1) passing a halogen gas and metallic halide vapor obtained in the manner hereinafter defined into a reaction zone containing solid particles of the metal in a suitably divided state, (2) maintaining a temperature within said reaction zone above the sublimation point of the desired metallic halide product and below the melting point of metal reactant by controlling the relative proportions of halogen gas and metallic halide vapor in step 1, whereby additional metallic halide vapor is formed by reaction of the halogen gas with the metal, (3) removing the metallic halide vapors from the reaction zone, (4) utilizing a cooled portion of the metallic halide vapors obtained in step 3 as the metallic halide vapor in step 1, and (5) recovering the remaining portion of the metallic halide from step 4 as product.

ROBERT W. GRIMBLE.

Certificate of Correction

Patent No. 2,385,505. September 25, 1945.

ROBERT W. GRIMBLE

It is hereby certified that errors appear in the printed specification of the above numbered patent requiring correction as follows: Page 2, first column, lines 8 and 14, for "bromide" read *bromine*; and second column, line 25, for "feed is" read *feed as*; and that the said Letters Patent should be read with these corrections therein that the same may conform to the record of the case in the Patent Office.

Signed and sealed this 23d day of April, A. D. 1946.

[SEAL]

LESLIE FRAZER,
*First Assistant Commissioner of Patents.*